April 30, 1957 W. J. PIETENPOL 2,790,952
METHOD OF OPTICALLY TESTING SEMICONDUCTOR JUNCTIONS
Filed May 18, 1953 2 Sheets-Sheet 1

INVENTOR
W. J. PIETENPOL
BY David H. Wilson, Jr.
ATTORNEY

April 30, 1957  W. J. PIETENPOL  2,790,952
METHOD OF OPTICALLY TESTING SEMICONDUCTOR JUNCTIONS
Filed May 18, 1953  2 Sheets-Sheet 2
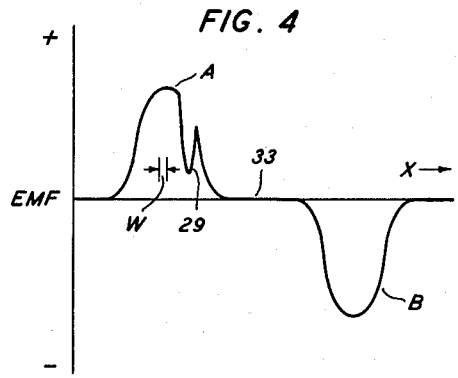
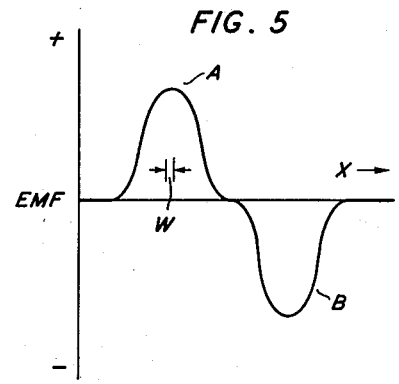
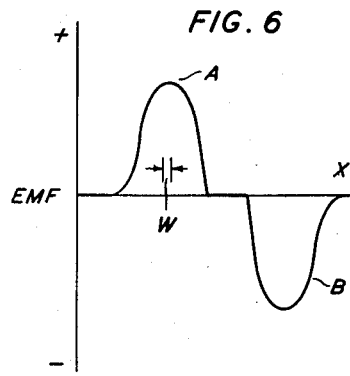
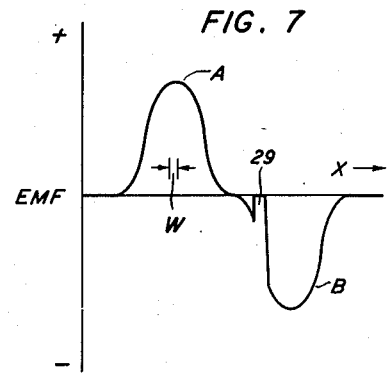
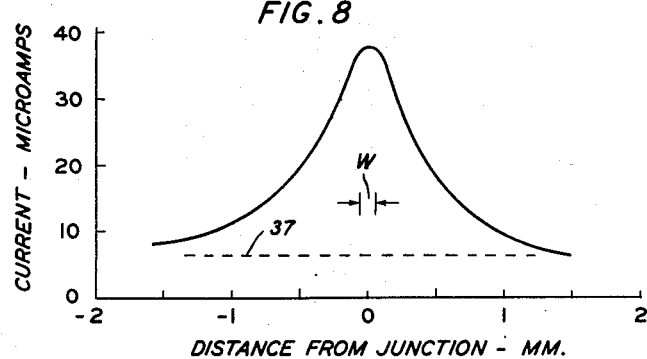
INVENTOR
W. J. PIETENPOL
BY David H. Wilson, Jr.
ATTORNEY United States Patent Office 2,790,952
Patented Apr. 30, 1957

2,790,952

METHOD OF OPTICALLY TESTING SEMI-CONDUCTOR JUNCTIONS

William J. Pietenpol, Whippany, N. J., assignor to Bell Telephone Laboratories, Incorporated, New York, N. Y., a corporation of New York Application May 18, 1953, Serial No. 355,477

7 Claims. (Cl. 324—158)

This invention relates to a method of testing semiconductive bodies containing n–p junctions.

In the fabrication of electrical translators having semiconductive bodies containing n–p junctions, it is often desirable to locate critically one or more junctions and to position electrodes on the body in close proximity to the junctions. Heretofore various techniques for locating these junctions have been employed. These have included preferential etching of either the n or p-type material, probing the surface with hot and cold contacts, or by moving a probe over the surface while a signal is applied thereto and the output monitored, and scanning the region of the junction with a light beam. It is sometimes desirable to locate one or more contacts with respect to the junctions without attacking or contacting the semiconductive surface, since the locating methods may disrupt the surface characteristics of the semiconductive body even to the extent of making the body useless for some applications.

An object of this invention is to facilitate the accurate location of the junctions between n and p-type material in a semiconductive body and the positioning of electrodes with respect to such junctions.

A feature of this invention resides in locating junctions in semiconductive bodies by the application of light and the monitoring of the electrical response of the bodies whereby no mechanical contact or corrosive attack of the body surface is required.

Another feature of the invention relates to accurately positioning a contact with respect to a junction, either on the junction or suitably spaced therefrom on either side thereof by the application of light in cooperation with an opaque index which casts a shadow on a portion of the light traverse.

In one embodiment of this invention, a spot of light is traversed across a semiconductive junction and an opaque index line is caused to cast a shadow over a portion of the traverse. The electrical response obtained from the device is monitored, for example on an oscilloscope, and the position of the shadow cast by the index line relative to the junction is indicated as a pip on the normal characteristic. Thus the location of a point in critical spaced relationship to a junction is ascertained by moving the index line and junction relative to each other until the pip is located as desired on the characteristic. A contact or a permanent indicium can then be applied to the shaded point in the light traverse on the semiconductive body.

The invention together with the above and other objects and features will be more fully understood from the following detailed description when read in conjunction with the accompanying drawing in which:

Figs. 2 through 7 show wave patterns observed on the oscilloscope shown in Fig. 1 for various specimens and various positions of an index; and Fig. 8 shows the characteristic obtained by another method of investigation according to this invention.

Figure 1:
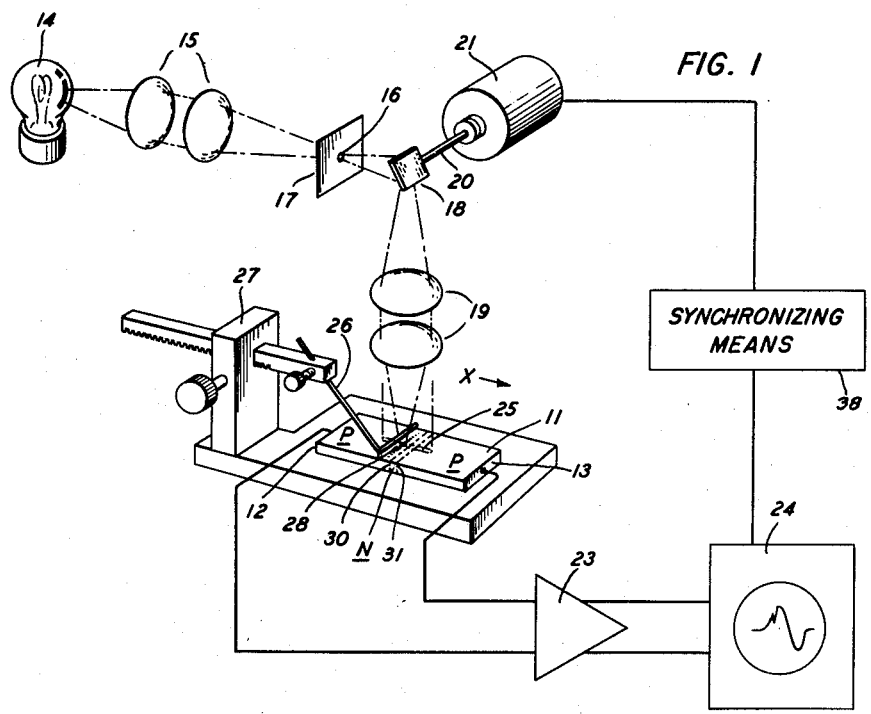
Fig. 1 is a schematic representation of one form of apparatus which can be employed in testing a device containing an n–p junction in accordance with this invention.

The study of semiconductors by optical means utilizes two phenomena: the photoconductive effect or change of resistance by the action of incident radiation; and the photovoltaic effect, or production of a potential difference across a junction by illumination of that junction. The level of response with either of these effects is a function of the intensity of the incident light. In both instances the response in the external circuit depends upon the collection at the junction of minority carriers produced by the photoelectric process at and near the junction.

Radiation falling on a semiconductive surface generates electron-hole pairs by exciting electrons out of the valence band and into the conduction band. The electrons and holes generated in this manner either recombine giving up most of their energy to the crystal lattice or the minority carriers pass out of the material thereby building up an electromotive force or appearing as a flow of current. Where there is negligible electric field, the minority charge carriers move principally by a diffusion process and must be generated within a few diffusion lengths of a boundary of the material to be reflected electrically in an external circuit. The farther away from the junction or field region the minority carriers are liberated the farther they must diffuse to be collected, and the greater is the probability that they will disappear by recombination on the way. This accounts for the decay in the traces shown in the drawings on both sides of the maximum, which is coincident with the junction.

In Fig. 1 an apparatus is shown for testing n–p junctions wherein the photovoltaic effect is utilized. This apparatus comprises means for sweeping a sharp line or point of intense light, referred to generically as a "spot of light" herein, over the surface of the semiconductive body 11 being investigated, means for shading a portion of the surface to provide a marker or index, and means for monitoring the electrical output from the electrodes 12 and 13 of body 11. A light source 14 is arranged to pass a beam through a condensing lens system 15 and a small aperture 16 in a mask 17 and onto a mirror 18. This beam is directed through an objective lens system 19 to the semiconductive body 11 and caused to sweep along a portion of that body by rotating the mirror 18. The mirror is mounted on the shaft 20 of the motor 21 which operates at a constant speed. Conveniently it may be of the synchronous type operating from a constant frequency source.

The body 11 is connected to an amplifier 23 through leads attached to electrodes 12 and 13, for example to a load resistance in the amplifier input. The output of the amplifier feeds the vertical deflection of an oscilloscope 24. When light impinges on the specimen in the vicinity of a junction an electromotive force is generated which registers as a vertical deflection on the scope. By synchronizing the horizontal sweep of the oscilloscope with the rotation of the mirror 18, a trace of the photoelectromotive force along the path 25 swept by the light spot is obtained. To this end, synchronizing means 38 is used to derive a position-sensitive signal from the motor 21 which is applied to the horizontal sweep of the oscilloscope 24. This synchronizing means 38 may be of the form known to workers in the art for such purpose.

Advantageously the traverse 25 of the light spot is perpendicular to the junctions 30 and 31. In the examples shown in Figs. 2 through 7 the traverse and oscilloscope sweep are from left to right and the body being investigated has a p—n—p structure. It is to be understood that the process applies equally well to n—p—n structures. The illustrative traces are obtained with the scope connected so that the electrode 12 at the end of the body which the light first traverses is the reference, e. g. when the left terminal is positive the trace is positive.

The resolution of this method depends on the size of the light spot in the direction normal to the junction. This size or width can be made very small with the system shown. Neglecting scattered light and lens aberration, the light spot on the specimen will be smaller than the original aperture 16 in the ratio of objective to image distance from the objective lens. In locating contacts on a typical germanium structure, it has been found convenient to employ a light spot and shaded area of the same order of thickness in the direction of traverse. The size of these elements should be less than 5 mils to insure a reasonable degree of resolution and preferably are less than 1 mil. The width of the light normal to the junctions is indicated on Figs. 2 through 8 by the line of length W.

As the light spot moves across the junctions, the vertical deflection of the oscilloscope is proportional to the electromotive force generated in the specimen at the junction. The electromotive force is proportional to the product of the quantum efficiency of the semiconductor and the collection efficiency of the junction. Thus a trace as shown at A in Fig. 2 results from sweeping a light spot across the p-n junction 30 in the $x$ direction and one as shown at B is produced when the spot sweeps the n-p junction 31.

In the present instance, when electron-hole pairs are generated by the incident radiation within a few diffusion lengths of a junction, some of the minority carriers, electrons in p-type material and holes in n-type material, will diffuse to and cross the junction thereby generating an electromotive force. The number of minority carriers crossing the junction increases as the incident radiation approaches the junction, reaching a maximum when the maximum intensity of radiation falls on the junction. Curves A and B illustrate this rise and fall of minority carrier collection as a plot of electromotive force generated by sweeping a light spot of constant intensity, from about .001 to 1.0 lumen, for example 0.1 lumen, and wavelength less than the cutoff or threshold wavelength, 1.2 microns for silicon and 1.85 microns for germanium, over the body against distance along the body as it appears on the oscilloscope of Fig. 1. Typical germanium diffusion lengths are from about 10 to 20 mils; hence the width of the regions represented by curves A and B are from 20 to 40 mils. Thus in many devices no flat region as shown in Figs. 2 through 4 occurs between curves A and B.

Figure 2:
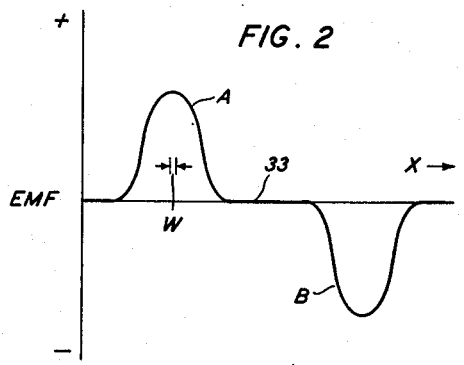
Figure 3:
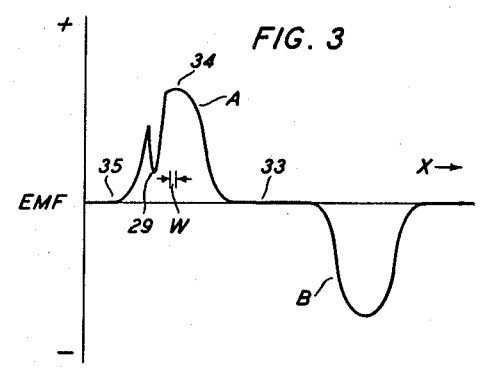

The trace in Fig. 2 can be utilized to accurately index the position of a junction or locate a contact with respect to a junction. This is accomplished by providing corresponding fiducial marks on the specimen and the oscilloscope presentation. A fine wire 26 mounted immediately over the specimen 11, positioned perpendicular to the light traverse 25, and movable with respect to the specimen and traverse by means of a manipulator 27, casts a fine line shadow 28 on the specimen. When this shadow falls within the region from which minority carriers are collected and reduces the number of electron-hole pairs generated in the shaded region, the number of minority charge carriers collected at the junction corresponding to that portion of the light traverse is reduced. This produces a pip 29 in the oscilloscope trace extending toward the reference level as shown in Fig. 3, which by its position, indicates the relative positions of the shadow 28 and junction 30.

It may be noted here that the length of the trace, the position of the humps, and the position of the pips are not absolute measures of positions of the elements to which they correspond, but rather, these positions are determined in part by the expansion of the horizontal sweep of the oscilloscope. Thus where adjacent junctions are separated by a greater distance than a few diffusion lengths a flat region 33 at the reference level will appear on the trace intermediate the humps A and B.

An indication of the separation of the shadow from the junction is readily obtained from the results realized from this method since that distance is releated to the minority charge carrier diffusion length in the material in the same ratio as the separation along the $x$ axis of the pip minimum and trace maximum is related to the distance along the $x$ axis from the point where the electromotive force trace intercepts the reference axis to the point of maximum electromotive force. Diffusion length is defined on page 314 of "Electrons and Holes in Semiconductors" by W. Shockley as that distance over which diffusing minority carriers attenuate to $e^{-1}$ of their initial density. The diffusion length of minority carriers in a particular semiconductive material can be obtained by employing the techniques taught by J. R. Haynes and J. A. Morton in their application "Testing of Semiconductors," Serial No. 198,864, filed December 2, 1950, now Patent 2,677,106, which issued April 27, 1954. For example, in Fig. 3 the minimum of the pip 29 appears to the left of the maximum 34 of hump A and separated from that maximum by a distance which is about two-thirds of the separation along the $x$ axis between the maximum and the point at which the photoresponse has dropped to $e^{-1}$ of the maximum value (about 0.37 of its maximum). This indicates that the shadow 28 is falling on the side of the junction from which the light traverse is initiated, the $p$ side in the example and about two-thirds of a diffusion length from the junction. When the pip is located on the opposite side of the maximum as shown in Fig. 4 it indicates that the shadow is on the opposite side of the junction from that where the light traverse is initiated and its separation from the junction can be calculated from the above ratio.

This technique is also convenient for locating a thin region of one conductivity type intermediate regions of opposite conductivity type as occurs for example in the fabrication of junction transistors from semiconductive bars containing an intermediate base zone of the order of several mils thick. The central portion of this zone, at least that portion greater than a minority carrier diffusion length from either junction can be located by moving the shadow 28 across one junction and into the region of no response 33 intermediate that junction and the second junction so that the trace at successive instants of time would appear as shown in Fig. 2, Fig. 3, Fig. 4 and Fig. 2.

In some junction transistor structures the base layer is so thin that no flat region is obtained in the trace resulting from sweeping the specimen, such a trace is shown in Fig. 5. With this construction, shading the center of the base layer with a fine line produces a trace as illustrated in Fig. 6 in which each peak is symmetrically distorted to produce an intermediate area of zero response. Often mechanical and fabricating considerations require that the base connection be positioned closer to one junction to avoid bridging the base layer. Such an orientation can be ascertained by observing the trace and manipulating the wire until a trace similar to that shown in Fig. 7 results.

While the information obtained by these techniques can be permanently recorded by applying marks directly to the body under the shaded area, the process also lends itself to the proper mounting of electrodes with respect to junctions. In any of the preceding instances, the wire 26 casting the shadow can be employed as an electrode and positioned accurately by first establishing the oscilloscope pattern which indicates the desired position is shaded, and then advancing the wire to contact the specimen along a path paralleling the path of the irradiating light, thereby mounting the contact on the area 28 which was shaded during the testing operation.

While the preceding description has been directed to a process wherein the photovoltaic property of the material is utilized, it is to be understood that the method could be practiced with only slight modification so that photoconductive effects can be employed in place of those described. Thus, by applying a reverse bias to a junction in the set-up shown in Fig. 1 this method can be utilized to investigate a somewhat greater area around a junction. The response of a typical reverse biased junction as a function of the position of a light spot when the latter is traversed across the semiconductor along a line perpendicular to the junction is shown in Fig. 8 as it might appear on an oscilloscope. The dotted line 37 indicates the reference level of current which obtains when the reverse bias is applied. When a bias is applied, the width of the area from which incident light excited minority charge carriers are collected is increased since a field exists in a space charge region surrounding the junction. Carriers are thus collected when excited within a distance on either side of the junction corresponding to the sum of the space charge extension and the minority charge carrier diffusion length in the material.

Shading of a portion of the light traverse within the region of collection as in the case where no bias is applied, will again produce a pip (not shown) on the trace obtained and indicate the relative positions of the junction and shadow. Of course the shadow can be adjusted to the desired position as indicated above and permanent indicia or contacts applied.

While the preceding description of this method of investigating a semiconductive body has been directed to the use of light as the irradiating energy, it is to be understood that other forms of energy can be employed. For example the body can be irradiated with soft X-rays and electron beams focused to a small spot.

It is to be understood that the above-described arrangements are illustrative of the invention. Numerous other arrangements may be devised by those skilled in the art without departing from the spirit and scope of the invention.

What is claimed is:

1. In the method of ascertaining the location of a point on a semiconductive surface in proximity to a junction with respect to the junction, the steps which comprise irradiating a portion of the semiconductive surface with a narrow spot of radiant energy, traversing the spot through the point and across the junction, mounting a member which is opaque to the energy intermediate the energy source and the semiconductor surface to shade the portion of the energy traverse on the point, monitoring the electrical response of the body as a function of distance along the body, and measuring the separation from the response maximum of the pip in the response caused by the shading of the traverse.

2. In the method of ascertaining the location of a point on a semiconductive surface in proximity to a junction with respect to said junction, the steps which comprise traversing a spot of light through said point and across said junction, shading said point from said light, reproducing the photoelectric response of the semiconductive body as a function of distance along the light traverse, and measuring the separation from the response maximum of the pip in the response caused by the shading of the traverse.

3. The method of ascertaining the location of the intermediate zone of a semiconductive body containing three contiguous zones of alternate conductivity type which comprises traversing the junctions separating said zones with a narrow spot of light, positioning a narrow opaque member intermediate the light source and the body to shade a portion of the traverse, monitoring the photoelectric response of the body as a function of distance along said body, moving said member and body relative to each other along said traverse and indexing the body at the points shaded when the pip in the photoelectric response produced by the shading of the traverse falls on each absolute maximum of the photoelectric response.

4. The method of positioning an electrode on a semiconductive body containing a junction in critical relationship to the junction which comprises, traversing a narrow spot of light over the surface of said body and across the junction, mounting an electrode intermediate the light source and the body to shade a portion of the traverse, monitoring the photoelectric response of said body as a function of distance along said body, and contacting said body with said electrode on the portion of the traverse which is shaded when the pip in the response caused by the shading of the traverse is in predetermined spatial relationship to the response maximum.

5. The method of positioning an electrode on the intermediate zone of a semiconductive body of photosensitive material containing three contiguous zones of alternate conductivity type the intermediate zones having a width of about two minority carrier diffusion lengths which comprise sweeping the three zones with a narrow spot of light, positioning an electrode intermediate said body and the light source spaced from said body to shade a portion of said body, monitoring the photoelectric response of the body as a function of distance along said body, moving the electrode along the path swept by the light to that point where the response is symmetrical, and bringing said electrode into contact with said body member on the area which is shaded when said response is symmetrical.

6. In the method of ascertaining the separation from a junction in a semiconductive body of a point on said body within a minority carrier diffusion length of said junction, the steps which comprise traversing a narrow spot of light over said point and across said junction, shading a narrow portion transverse of said traverse and including said point from said light, displaying the photoelectric response of said semiconductive body as a function of the position of said light spot, and measuring the separation from the maximum in the response to the minimum of the pip in the response due to the shading of said point as a function of the distance along said response corresponding to a minority carrier diffusion length.

7. The method of positioning an electrode on a semiconductive body containing a junction at a point which is a predetermined fraction of a minority carrier diffusion length from said junction which comprises, traversing a spot of light over the surface of said body and across the junction, shading a portion of the light traverse on said body, monitoring the photoelectric response of said body as a function of the position of said light spot thereon, positioning the shaded portion of said light traverse to produce a pip in the response having a minimum whose separation from the response maximum is said predetermined fraction of the distance along said response corresponding to a minority carrier diffusion length.

References Cited in the file of this patent

UNITED STATES PATENTS

| | | |
|---|---|---|
| 2,560,606 | Shive | July 17, 1951 |
| 2,588,254 | Lark-Horovitz et al. | Mar. 4, 1952 |
| 2,641,712 | Kircher | June 9, 1953 |
| 2,646,609 | Heins | July 28, 1953 |
| 2,677,106 | Haynes et al. | Apr. 27, 1954 |